US012806835B2

(12) United States Patent
Bisetto et al.

(10) Patent No.: US 12,806,835 B2
(45) Date of Patent: Nov. 24, 2026

(54) GUILLOTINE OBTURATION VALVE FOR INJECTION MOLDING

(71) Applicant: INGLASS S.P.A., San Polo di Piave (IT)

(72) Inventors: Massimo Bisetto, San Polo di Piave (IT); Massimo Rossi, San Polo di Piave (IT); Alessandro Dario, San Polo di Piave (IT)

(73) Assignee: INGLASS S.P.A., San Polo di Piave (IT)

( * ) Notice: Subject to any disclaimer, the term of this patent is extended or adjusted under 35 U.S.C. 154(b) by 0 days.

(21) Appl. No.: 18/721,675

(22) PCT Filed: Sep. 14, 2023

(86) PCT No.: PCT/IB2023/059118
§ 371 (c)(1),
(2) Date: Jun. 19, 2024

(87) PCT Pub. No.: WO2024/095073
PCT Pub. Date: May 10, 2024

(65) Prior Publication Data
US 2026/0158717 A1 Jun. 11, 2026

(30) Foreign Application Priority Data
Nov. 4, 2022 (IT) ........................ 102022000022635

(51) Int. Cl.
*F16K 3/02* (2006.01)
*B29C 45/23* (2006.01)
(Continued)

(52) U.S. Cl.
CPC ............ *B29C 45/23* (2013.01); *F16K 3/0281* (2013.01); *F16K 3/029* (2013.01); *F16K 3/314* (2013.01);
(Continued)

(58) Field of Classification Search
CPC .......... F16K 3/0281; F16K 3/029; F16K 3/34; F16K 3/32; F16K 3/24; F16K 3/03;
(Continued)

(56) References Cited

U.S. PATENT DOCUMENTS 5,511,968 A 4/1996 Guzzini et al.
6,056,536 A * 5/2000 Schad ................ B29C 45/1603 425/562
2017/0292616 A1* 10/2017 Moens ................. F04C 29/124

FOREIGN PATENT DOCUMENTS

CN 114193713 A 3/2022

OTHER PUBLICATIONS

International Search Report for PCT/IB2023/059118 Mailed on Dec. 22, 2023.

* cited by examiner

*Primary Examiner* — Kelsey E Cary
(74) *Attorney, Agent, or Firm* — Rivka Friedman

(57) ABSTRACT

An obturation valve is described for controlling a flow of molten material exiting a nozzle towards a mold cavity, comprising:
- a channel, for the molten material, which extends along a first axis,
- an obturating member mounted
- movably along a respective second axis, and
- so that a free end of the obturating member can move towards, and reach, a point inside the channel to throttle the channel thereby regulating said flow,
- a rotatable member placed in proximity of the nozzle,
- wherein a portion of the obturating member is coupled to the rotatable member so that a rotation of the rotatable member entails a translation of the obturating member along the second axis from and/or towards said point.

20 Claims, 3 Drawing Sheets

(51) Int. Cl.
*F16K 3/314* (2006.01)
*B29C 45/28* (2006.01)

(52) U.S. Cl.
CPC .................. *B29C 2045/237* (2013.01); *B29C 2045/2813* (2013.01); *B29C 2045/2855* (2013.01)

(58) Field of Classification Search
CPC .... B29C 2045/2813; B29C 2045/2855; B29C 45/281; B29C 45/30; B29C 45/2806
See application file for complete search history.

GUILLOTINE OBTURATION VALVE FOR INJECTION MOLDING

TECHNICAL FIELD

The invention relates to a guillotine obturation valve for controlling a flow of molten material during an injection molding process.

BACKGROUND

It is well known to control the flow of molten material exiting a nozzle towards a mold cavity via a stem (pin) that is linearly movable back and forth. However, the presence and alternating movement of the stem increases flow perturbations by creating areas of buildup and stagnation of material, so much so that, e.g., the operation of changing the color of the injected material requires multiple purge injections with substantial waste of material. Oblique stems as in EP520345 have the defect of pushing the material against the inner surface of the channel, further compressing it up to the outlet. This squeezing effect causes defects to appear on the final piece.

In an attempt to solve the problem, the stem shutter was replaced by a guillotine valve placed in the nozzle area. This solution, adopted for the simultaneous opening and closing control of multiple injectors placed in line and controlled by a single actuator, is e.g. disclosed in EP1409222 (FIG. 13). However, a single movable guillotine results in squashing of the material toward the nozzle perimeter, which is at a lower temperature, thus causing defects in the molded product.

A better solution, as in EP1064138, is to use two opposing guillotines that have the closing point at the center of the channel, because there the temperature is higher. EP1064138, however, envisages two planar guillotines driven by a single actuator located on the distant perimeter of the mold, with considerable complications in the actuation, and imprecise control, of the position of the guillotines.

SUMMARY

The main object of the invention, defined in the attached claims in which the dependent ones define advantageous variants, is to improve this state of the art.

Particular object is to improve the actuation of the movable obturating parts.

At least one object is achieved by an obturation valve for controlling a flow of molten material exiting a nozzle toward a mold cavity, comprising:

- a channel, for the molten material, extending along a first axis,
- an obturating member mounted
  - movably along a respective second axis (orthogonal or inclined at an acute angle to the first axis) and
  - so that a free end of the obturating member can move toward, and reach, a point inside the channel to throttle and/or close the channel thereby regulating said flow,
  - a rotatable member placed in proximity of the nozzle,
- wherein a portion of the obturating member is coupled, in particular directly, to the rotatable member so that a rotation of the rotatable member entails a translation of the obturating member along the second axis from and/or toward said point, in particular so that a rotation of the rotatable member, even a partial rotation, entails a progressive translation, and proportional thereto, of the obturating member.

The above valve has several advantages because it allows:

- the elimination of the stem housed in the channel, which results in excessive pressure drops and perturbations in the flow;
- the elimination of all components installed to control and guide the stem which are frequently causing losses and high-pressure leakage, such as the valve bushing;
- the elimination of the need to place the actuators above the stem for an easy activation. Placing the actuators in different positions allows the total thickness of the hot runners and mold to be decreased/contained;
- the reduction of the force and energy required to command and maintain the obturation of the channel, i.e. complex and distributed mechanisms as in EP1064138 are avoided. In other words, the valve components are arranged/grouped near and/or around the obturating members, avoiding long kinematic chains to actuate them.
- the local actuation of the obturating member improves its accuracy and facilitates the compactness of the valve, which is easy to maintain because it can be removed without disassembling the mold.

The actuation system for the valve obturating members is irrespective of the number and configuration of obturating members, which advantageously can be more than one.

Said point inside the channel, which is the destination of the free end of the obturating member, may be a point at the center of the channel (i.e. near the axis of the channel), a point at the periphery of the channel (i.e. near the walls of the channel, offset from the axis of the channel), or a point intermediate to the previous two conditions.

In a compact preferred variant, the rotatable member extends around (and e.g. also surrounds) the first axis and the channel; specifically, the rotatable member comprises a ring that surrounds the first axis and the channel.

In a preferred variant, the rotatable member is rotatably mounted on a fixed (i.e. stationary) member that

- is fixed relative to the mold (and e.g. attached to or on a plate of the mold) and
- in particular may comprise a surface that forms a portion of the mold cavity.

Thus the fixed member can be quickly inserted into a seat of a plate of the mold and easily removed for maintenance.

In preferred variants, the fixed member

- is substantially torus-shaped; and/or
- comprises cooling means (e.g. ducts for cooling fluid), and/or
- is a one-piece body in which sliding channels are made for the obturating members, or is composed of two matching parts coupled along a joining surface, on the joining surface being made seats or channels for moving the obturating members.

In a preferred variant, the rotatable member comprises a profile (e.g. eccentric or a cam) to which said portion of the obturating member is slidingly coupled, the profile having a development that converts a rotation of the rotatable member into a translation of the obturating member along the second axis. For example, the profile has

- a circular development, concentric to the rotation axis of the rotatable member, or
- a spiral development converging toward the rotation axis of the rotatable member.

In a preferred variation, the rotatable member comprises a ring or crown coaxial to the first axis (and e.g. also to said fixed member), and e.g. said profile is a groove or fin or cam formed in relief in the crown or ring. In order to move the obturating member, the groove or fin may have an increasing height or depth along its length, and/or a distance from the rotation axis of the rotatable member that varies along the length of the profile. The conformation of the groove or cam determines the width of the stroke of a or each obturating member.

In a preferred variant, the rotatable member has a rotation axis that is parallel to the first axis, in particular for maximum compactness the rotatable member has a rotation axis coaxial to the first axis, or orthogonal to a plane passing through (and incident to) the first axis.

In a preferred variant, the valve comprises two or more obturating members whose respective second axes are coplanar and arranged in a radial pattern with respect to said point, or as the diagonals of a (regular or irregular) polygon wherein said point locates the center of the polygon.

In a preferred variant, the valve comprises only two obturating members movable along the sides of an angle with a vertex at said point, wherein the lying plane of the angle is orthogonal to, or passing through, the first axis.

In the case of two or more obturating members said point becomes a common convergence point, or a point of channel closure, for the translation of the obturating members (and for the second axes).

In a preferred variant, the valve comprises three or more obturating members and their respective second axes are arranged like the edges of an imaginary pyramid, said convergence point forming the apex of the pyramid. In a more preferred variant, said imaginary pyramid is arranged so that its base intersects the first axis and the channel, more specifically so that it is orthogonal to the first axis.

In a preferred variant, which improves the injector performance, the valve comprises two or more obturating members that are actuated by the rotatable member and mounted movable along a respective second axis inclined at an acute angle with respect to the first axis and so that one free end of each obturating member can move and converge to the same convergence point within the channel, the free ends of the obturating members being able to match at said convergence point to compose a blocking bulkhead for the molten material.

The above configuration of the obturating members (positioned obliquely to the axis of the injector) has several advantages:

the obturating members take up less space around the injector, so it is possible to place the nozzle on a surface of the mold die according to an axis that is not perpendicular to the normal of the molding surface (useful in certain applications);

the strength of the mold die increases, due to the progressive spacing of the seat of the obturating members from the molding surface, where pressure forces due to the injected molten material act to induce bending and stress concentrations within the die. If such stresses act on a reduced mold section, they could induce fractures;

the more collected structure of the obturating members allows the injection point to be placed within deep recesses in the mold, the cooling circuits can be placed closer to the gate, passing between the obturating members and the molding surface, for better gate conditioning (heating or cooling as needed);

the sliding seat of the obturating members is less affected by the pressure that the molten material exerts on them (obturating members orthogonal to the axis of the injector could be compressed and therefore slide poorly);

the obturating members are less thermally affected by the conditions of the molding surface, being contained in a larger mold section which has superior thermal inertia characteristics.

An improvement in the injector performance occurs when the valve comprises three or more obturating members (oblique or not with respect to said first axis) that are movable toward a common convergence point within the channel to join therein and compose a bulkhead for closing the channel, and means (e.g. the aforementioned rotatable member) to move all three or more obturating members simultaneously toward or away from said convergence point.

The use of three or more obturating members makes it possible to better balance the forces acting on them and/or the rotatable member, and to limit or avoid abnormal wear of the rotatable member. If e.g. an obturating member, due to excessive and unexpected stress, malfunctions, the residual stress is distributed over at least two other obturating members, reducing the possibility of an overall malfunction of the valve.

With three or more cooperating obturating members any temporary irregularity is therefore less likely to block the molding process, and the valve would continue to operate leading to a new equilibrium condition.

The use of three obturating members results in an excellent compromise between simplicity of construction and the need to reduce stagnation zones of molten material in front of the nozzle tip that would be deleterious to the molding. In fact, three or more obturating members make it possible to ensure good uniformity in the thickness of the molten material in front of the nozzle tip, thus ensuring uniform heating of that material and limiting local cooling phenomena;

because it effectively "cuts off" the flow of the molten material even when the flow cools and becomes more viscous;

allows a homogeneous flow of molten material during the opening of the obturating members, limiting or eliminating the effect of flow splitting between the obturating members that are not yet fully retracted from said point;

the bulkhead has very strong conformation, since the pressure due to shear is better distributed and without stress concentrations (the dihedral forming at the end of the obturating members causes the molten material to be pushed laterally and not simply compressed, thus leading to better evacuation of the material).

In particular, it is advantageous for all the obturating members to be connected to the rotatable member. In this case, note that the rotatable member acts as a means for synchronizing the movement of the obturating members toward and from said point.

In particular, said acute angle is equal for all the second axes of the obturating members.

In a preferred variant, the valve comprises an elastic means adapted to generate a force to push a or each obturating member toward or away from said convergence point.

In a preferred variant, the valve comprises a drive adapted to rotate the rotatable member by a predetermined (and/or programmable) angle. In a more preferred variant, the drive comprises an actuator with a linearly translatable arm, the arm being connected to the rotatable member so as to convert a thrust and/or a pull of the arm into a rotation of the rotatable member.

The free end of the arm e.g.

is pivoted at a peripheral point of the rotatable member, so that the thrust and/or pull of the arm is converted into a torque on the rotatable member, or comprises a rack engaged in a toothed crown of the rotatable member so that the push and/or pull of the arm is converted into a torque on the rotatable member.

In a preferred variant, the drive comprises an actuator with a rotary shaft, wherein the shaft is connected to the rotatable member so as to convert a rotation of the shaft into a rotation of the rotatable member, or comprises a nut-screw that meshes with a toothing provided on the rotatable member, so that a rotation of the nut-screw is converted into a rotation of the rotatable member, or comprises a gear that meshes with a toothed crown of the rotatable member, so that a rotation of the shaft transfers rotary motion to the rotatable member.

In a preferred variant, the valve comprises a sensor (e.g. a rotary encoder or a potentiometer or a microswitch) adapted to detect an angular stroke of the rotatable member.

The valve in a preferred variant comprises an end-of-travel sensor (e.g. microswitches or linear/angular position encoders) to control the opening/closing position and/or intermediate positions of a or each obturating member. The end-of-travel sensor may be installed to detect the position of one or each obturating member and/or the angular position of the rotatable member and/or an actuating organ of the actuator or component thereof (e.g. said arm or said rotary shaft, or a gear or other).

In a more preferred variant, the valve comprises an electronic circuit that is connected to one or each of said sensor for reading a signal therefrom and connected to the drive to drive its operation. Specifically, the electronic circuit is configured (and/or programmed) to implement an angular position feedback control on the rotatable member via the sensor and the drive.

The obturating members may have a circular, rectangular, prismatic or other cross-section; and/or comprise a heating device, e.g. integrated into the body of the obturating member. The heating device may be an electrical resistor, or a coiled inductive heating device, controlled and regulated by a thermocouple.

Another aspect of the invention relates to a system of two or more valves, each valve being defined as above, wherein the rotatable members of each valve are connected to each other so that they can be operated synchronously, particularly by a same single actuator.

Preferably, the rotatable members of two valves or all the valves form or make up a kinematic chain that connects the rotatable members. More preferably, the rotatable members of two valves are connected to each other by an idle gear, or the rotatable members of all the valves are connected to a common driving organ.

Specifically, the system comprises:

two or more valves, each valve being defined as above, means for transferring the rotary motion of a rotatable member of one valve, called primary rotatable member, to the rotatable members of all other valves of the system, an actuator to transfer motion to the primary rotatable member.

One or each obturating member may also roto-translate (or translate on itself) during its movement to and/or from said point. More particularly, a portion of the obturating member, or said coupled portion of the obturating member, is connected to the rotatable member so that a rotation of the rotatable member entails a translation of the obturating member along the second axis and also a rotation of the obturating member to and/or from said point. More specifically, the rotation of the obturating member occurs about said second axis.

BRIEF DESCRIPTION OF THE DRAWINGS

The advantages of the invention will be even clearer from the following description of a preferred actuator, in which.

DETAILED DESCRIPTION

In the figures equal elements are indicated by equal numbers, and to avoid crowding the drawings sometimes only some elements are numbered.

Figure 1:
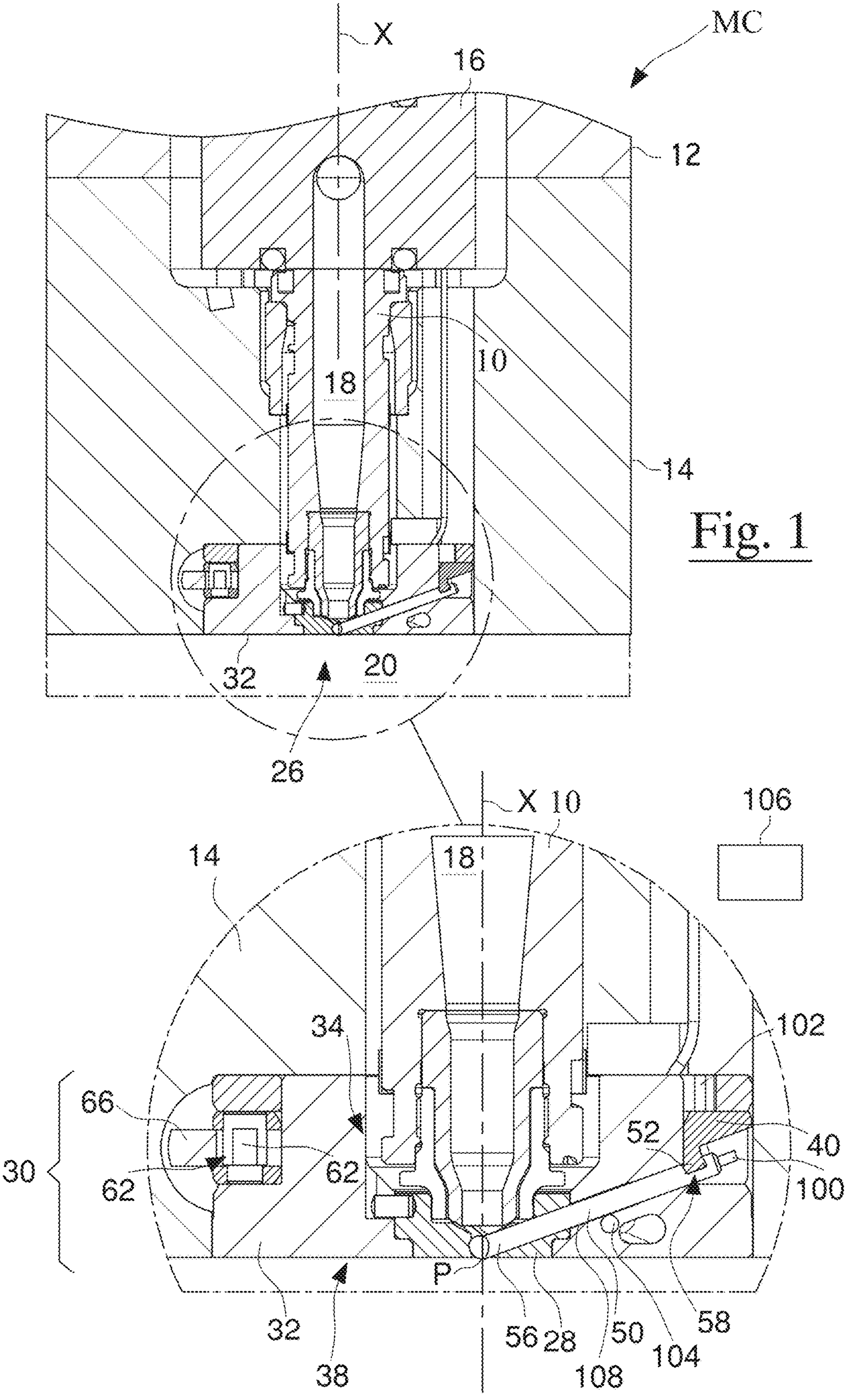
FIG. 1 shows a cross-sectional view of an obturation valve.

FIG. 1 partially shows a mold MC comprising an injector 10 that is enclosed within mold plates 12, 14 clamped against each other. The injector 10 is connected to a known manifold 16 to receive molten material and convey it via a channel 18 to a nozzle 26 from which it is injected inside a mold cavity 20.

At the nozzle 26, the channel 18 extends linearly along an X axis and can be throttled by an occlusion valve 30.

The valve 30 comprises a cylinder or torus shaped body 32 that is fixed on the plate 14 and faces the cavity 20. The body 32 has a central pass-through cavity 34 in which the nozzle tip 28 and the end of the injector 10 are located. The nozzle tip 28 abuts internally against the body 32, which has a surface 38 that participates in making up the mold cavity. Optionally and advantageously, the surface 38 can be variously shaped or, at the bottom of the body 32, a shaped plate or member can be added. The X axis coincides with the axis of the body 32.

Figure 2:
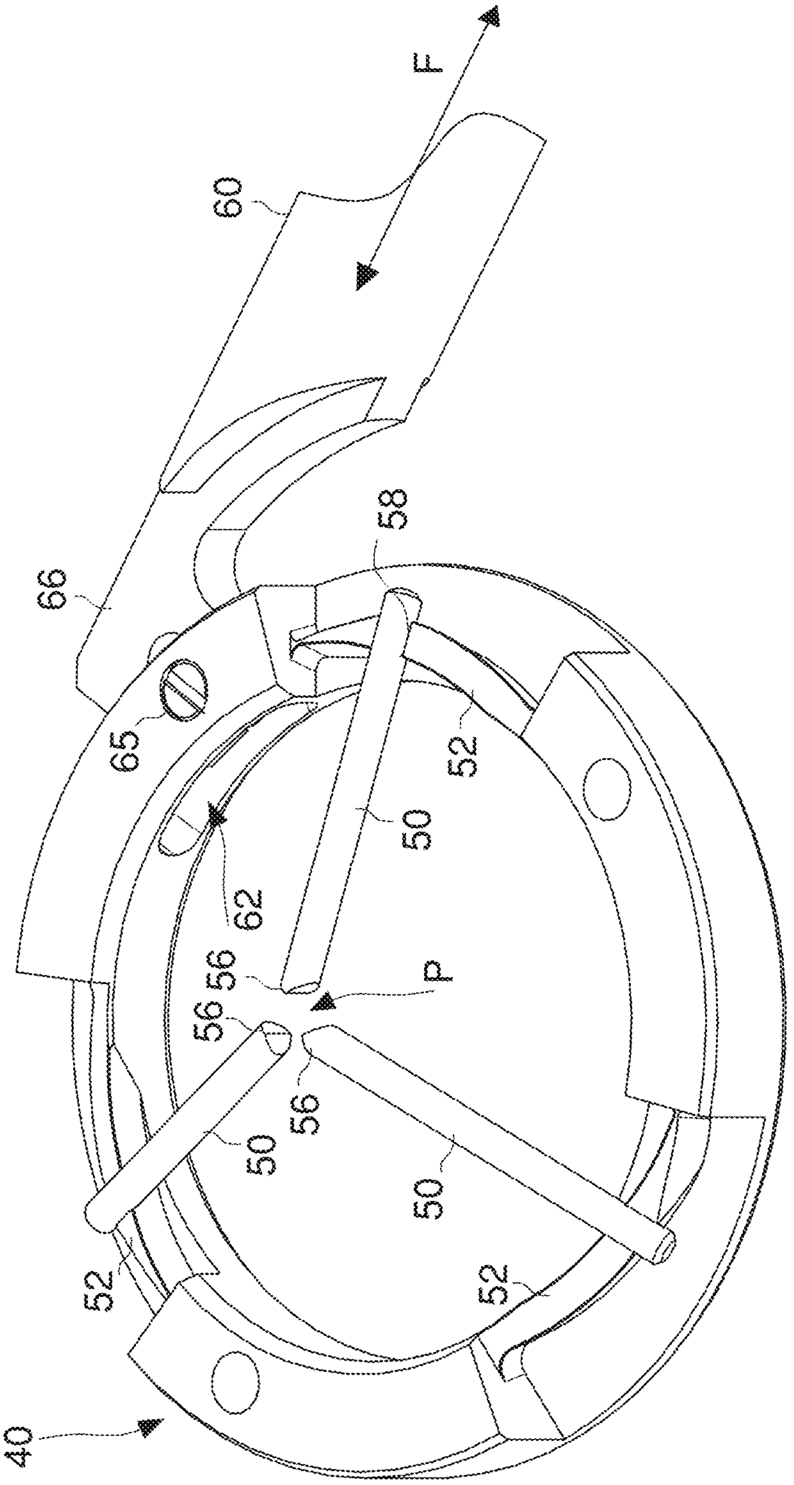
FIG. 2 shows a three-dimensional view of valve components.

In seats provided inside the body 32, are slidably mounted obturating members 50, e.g. three. Specifically, the obturating members 50 are all equal and/or made e.g. as pins or lamellae (see also FIG. 2) having circular or polygonal cross-sections, but not necessarily.

The obturating members 50 are arranged along the edges of an imaginary regular triangular-base pyramid and converge toward a convergence point P located along the X-axis and in the center of the channel 18 near the outlet of the channel 18 inside the cavity 20. The imaginary pyramid has a base orthogonal to the X axis.

The arrangement of the obturating members 50 allows them to slide linearly toward the point P until their tips 56, properly shaped, touch. As the obturating members 50 approach the convergence point P, they form a bulkhead that gradually closes the channel 18. When the tips 56 join at the point P, the channel 18 is completely closed and the molten material can no longer pass through the nozzle 26 toward the cavity 20.

An annular-shaped rotatable member 40 (see also FIG. 2) is mounted coaxially on the body 32 so that it can rotate about the X axis with respect to the body 32. The surface of the rotatable member 40 facing the cavity 20 (the surface opposite the plates 12, 14) has three profiles 52, e.g. fins in relief, having a longitudinal development that follows a spiral arc converging toward the center of the rotatable member 40 (i.e. toward the X axis). The profiles 52 are arranged with polar symmetry around the X axis.

The obturating members 50 are arranged along radii originating from the center of the rotatable member 40, such center coinciding with the point P. The end of each obturator 50 opposite the tip 56 has a recess 58, e.g. a notch, complementary to the thickness or outline of the profiles 52. Each recess 58 is snugly slidingly mounted astride a respective profile 52. In the figures, as examples, the recesses 58 and the profiles 52 are rectangular in cross-section.

It follows that a rotation of the rotatable member 40 results in the progressive relative sliding of the profiles 52 within the recesses 58, and the decreasing distance from the X axis of the edges of the profiles 52 progressively pushes the obturators 50 toward the point P, i.e. toward the center of the channel 18 (closure of the nozzle 26). A rotation of the rotatable member 40 in the opposite direction results in the retrogression of the obturators 50 away from the point P (opening of the nozzle 26).

Then the degree of occlusion of the channel 18 can be controlled by controlling the angular stroke of the rotatable member 40.

Preferably, the profiles 52 are all equal so that each obturating member 50 is transmitted the same motion dynamics and the obturating members 50 can be moved synchronously. If necessary, the profiles may be different from each other.

Various means and actuators (electrical, pneumatic, or hydraulic types) can be used to set the rotatable member 40 into rotation.

A preferred embodiment envisages the rotatable member 40 having a radial slot 62 into which the head 66 of an arm 60 is insertable. The head 66 is pivoted in the radial slot 62 about an axis parallel to the X axis by a pin 65, and the arm 60 is arranged approximately along a straight line tangent to the perimeter of the rotatable member 40. The arm 60 is slidable back and forth (see arrow F in FIG. 2), moved e.g. by an electric motor or a pneumatic or hydraulic actuator. The reciprocating movement of the arm 60 forces the rotation of the rotatable member 40 in two opposite directions.

A different preferred embodiment (FIG. 3) envisages the rotatable member 40 having an outer toothing 70 on which is engaged a rack 72 provided on the arm 60. Again, the reciprocating linear motion of the arm 60 imposes the rotation of the rotatable member 40 in two opposite directions.

A different preferred embodiment (FIG. 4) involves the rotatable member 40 having an external toothing 70, which meshes with a thread 80 provided on the head 82 of a rotating shaft 84. The rotary motion of the shaft 84 forces the rotation of the rotatable member 40 in two opposite directions.

Figure 5:
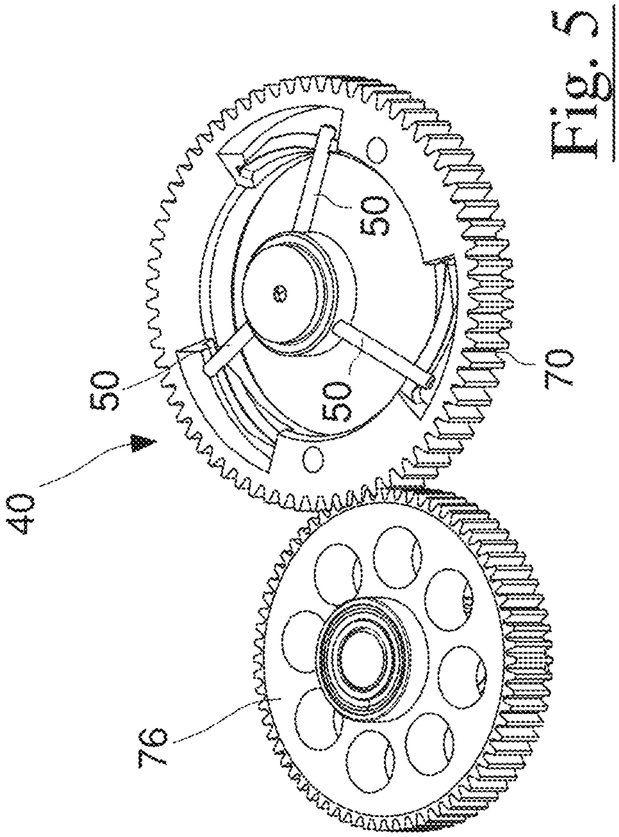
FIGS. 3-6 show valve variants.

A different preferred embodiment (FIG. 5) envisages the rotatable member 40 having the outer toothing 70 meshing with a gear/pinion 76 driven into rotation by, for example, an electric motor or a rack (analogous to the rack 72). Then, the rotary motion of the pinion 76 can force the rotation of the rotatable member 40 in two opposite directions. The gear 76, the thread 80 and the rack 72 make up a kinematic chain of transmission and transformation of the linear or rotary motion provided by the actuator. The kinematic chain can vary/modify the number of revolutions and torque supplied to the rotatable member 40.

The shape of the obturating members 50 may vary from what is illustrated. In particular, the base of said imaginary pyramid may be any polygon, and the geometric choice of the pyramid defines the position and number of the obturating members 50.

There can also be only two movable obturating members 50 along the sides of an angle with vertex at the point P, wherein the lying plane of the angle may be orthogonal to the X axis or passing through the X axis. There can also be only one obturating member 50, in which case the point P does not lie along the X axis but is shifted to the perimeter edge of the channel 18. The directions in which the obturators 50 move may also vary from what has been illustrated. In particular, a different preferred embodiment is that the obturators 50 all move along one and the same plane, that is, they are arranged to slide along the diagonals of a regular polygon (the point P then being the barycenter of the polygon); or, if there are two obturators 50, along one and the same line.

In preferred variants, the valve 30 comprises:

- an elastic means 100, e.g. a spring, adapted to generate a force to push one or each obturating member 50 toward or away from the point P; and/or
- a sensor 102 (e.g. a rotary encoder or a potentiometer or one or more microswitches placed externally and acting against appropriate abutments to detect end-of-travel positions) adapted to detect an angular stroke of the rotatable member 40; and/or
- a sensor 104 to control the linear position of one or each obturating member 50; and/or
- an external electronic circuit 106 connected to the sensor, for reading a signal from it, and connected to the drive/actuator to drive/control its operation. For example, the electronic circuit 106 is configured (and/or programmed) to implement an angular position feedback control on the rotatable member 40.

In a more preferred variant, one or each obturating member 50 comprises a local-heating device 108.

Figure 6:
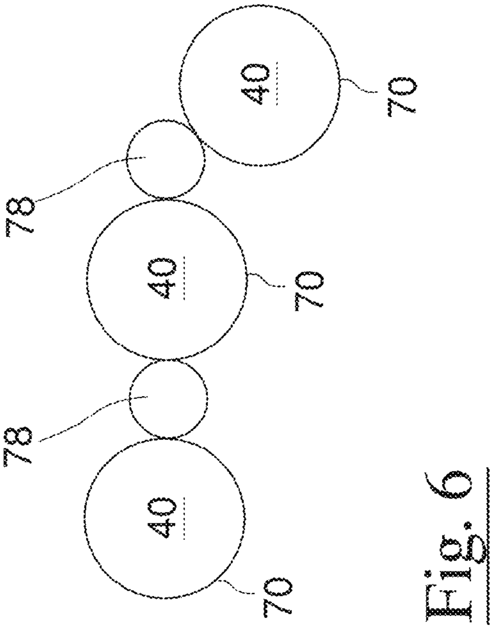

In a preferred variant that favors compactness, two or more valves 30 may be controlled by a single drive. E.g. in FIG. 5 the gear 76 could be connected to several toothings 70 of different valves 30. Or (FIG. 6) between various toothings 70 of different members 40 an idle gear 78 could be placed to transfer rotary motion from one valve 30 to another, so as to form a kinematic chain comprising all members 40. In FIG. 6 motion could be imparted to any of the gears 78 or to any of the members 40.

The transmission of rotary motion through a cascade of gears instead of lever linkages improves the precision of the system.

The nozzle may be of the circular type or with different cross-section, such as rectangular or other polygonal shape.

Figure 3:
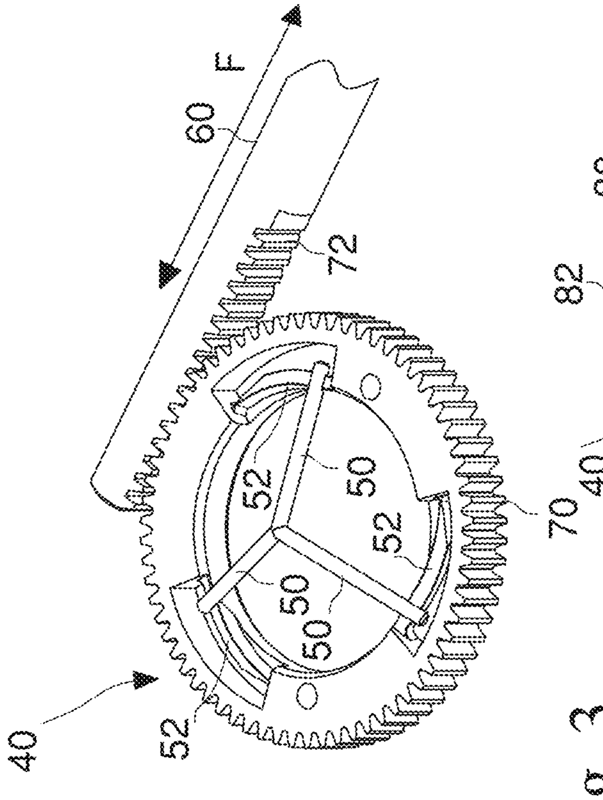
Figure 4:
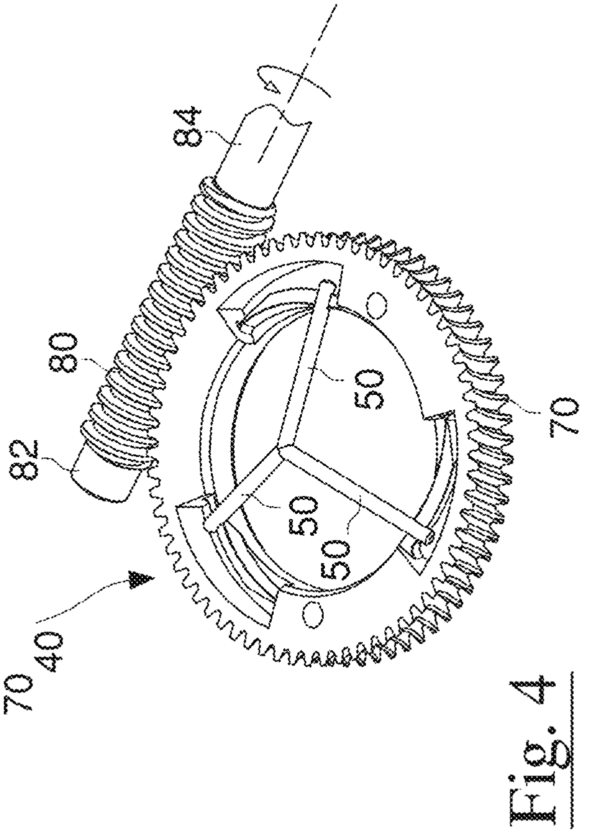

With reference to FIGS. 3 and 4, it is possible to control a pair or multiple rotors 40 with the same shaft 84. E.g. it is sufficient to juxtapose to the shaft 84 multiple rotatable members 40 in any position (more or less distant from each other, on opposite sides of the shaft 84). Similarly, the rack 60, if made with a toothing on two opposite sides, can also drive multiple rotatable members 40 at the same time. The obturating members 50 may also translate by rotating on themselves, not only translate.

The invention claimed is:

1. An injector for receiving molten material and convey it via a channel to a nozzle for injection into a mold cavity, the injector comprising said nozzle and an obturation valve for controlling a flow of molten material exiting the nozzle towards the mold cavity, the obturation valve comprising:

said channel, for the molten material, which extends along a first axis, an obturating member mounted movably along a respective second axis inclined at an acute angle to the first axis, and so that a free end of the obturating member can move towards, and reach, a point inside the channel to throttle the channel thereby regulating said flow, a rotatable member placed in proximity of the nozzle, wherein a portion of the obturating member is coupled to the rotatable member so that a rotation of the rotatable member entails a translation of the obturating member along the second axis from and/or towards said point.

2. The injector according to claim 1, wherein the rotatable member comprises a ring surrounding the first axis and the channel.

3. The injector according to claim 2, comprising three or more obturating members whose respective second axes are arranged like the edges of an imaginary pyramid, said point forming the apex of the pyramid;

all the obturating members being connected to the rotatable member of the valve.

4. The injector according to claim 2, wherein said point inside the channel is a point at the center of the channel, a point at the periphery of the channel, or a point intermediate to the two preceding conditions.

5. The injector according to claim 4, comprising three or more obturating members whose respective second axes are arranged like the edges of an imaginary pyramid, said point forming the apex of the pyramid;

all the obturating members being connected to the rotatable member of the valve.

6. The injector according to claim 1, wherein said point inside the channel is a point at the center of the channel, a point at the periphery of the channel, or a point intermediate to the two preceding conditions.

7. The injector according to claim 1, wherein the rotatable member is rotatably mounted on a stationary member which is mounted on a mold plate.

8. The injector according to claim 7, wherein the stationary member is a one-piece body in which a sliding channel for the obturating member is made, or is made up of two matching parts coupled along a joining surface, on the joining surface being made a seat or a channel for accommodating—and the motion of—the obturating member.

9. The injector according to claim 8, comprising three or more obturating members whose respective second axes are arranged like the edges of an imaginary pyramid, said point forming the apex of the pyramid;

all the obturating members being connected to the rotatable member of the valve.

10. The injector according to claim 7, comprising three or more obturating members whose respective second axes are arranged like the edges of an imaginary pyramid, said point forming the apex of the pyramid;

all the obturating members being connected to the rotatable member of the valve.

11. The injector according to claim 1, wherein the rotatable member comprises a profile to which said portion of the obturating member is slidingly coupled, wherein the profile, for converting a rotation of the rotatable member into a translation of the obturating member along the second axis, has a development which is circular and concentric to the rotation axis of the rotatable element, or a spiral development converging towards the rotation axis of the rotatable member.

12. The injector Valve according to claim 11, wherein the rotatable member comprises a ring or a crown coaxial to the first axis, and said profile is a groove, or fin or cam formed in relief, in the crown or ring.

13. The injector according to claim 12, comprising three or more obturating members whose respective second axes are arranged like the edges of an imaginary pyramid, said point forming the apex of the pyramid;

all the obturating members being connected to the rotatable member of the valve.

14. The injector according to claim 11, comprising three or more obturating members whose respective second axes are arranged like the edges of an imaginary pyramid, said point forming the apex of the pyramid;

all the obturating members being connected to the rotatable member of the valve.

15. The injector according to claim 1, wherein the rotatable member has a rotation axis which is coaxial to the first axis.

16. The injector according to claim 15, comprising three or more obturating members whose respective second axes are arranged like the edges of an imaginary pyramid, said point forming the apex of the pyramid;

all the obturating members being connected to the rotatable member of the valve.

17. The injector according to claim 1, comprising:

only two obturating members movable along sides of the angle with a vertex at a point, wherein a plane of the angle is orthogonal to the first axis or passing through the first axis, all the obturating members being connected to the rotatable member of the valve.

18. The injector according to claim 1, wherein the rotatable member is rotatably mounted on a stationary member which is mounted on a mold plate and comprises a surface that forms a portion of the mold cavity.

19. The injector according to claim 18, wherein the stationary member is a one-piece body in which a sliding channel for the obturating member is made, or is made up of two matching parts coupled along a joining surface, on the joining surface being made a seat or a channel for accommodating—and the motion of—the obturating member.

20. The injector according to claim 1, comprising three or more obturating members whose respective second axes are arranged like the edges of an imaginary pyramid, said point forming the apex of the pyramid;

all the obturating members being connected to the rotatable member of the valve.

* * * * *